US011474975B2

(12) United States Patent
Willard et al.

(10) Patent No.: US 11,474,975 B2
(45) Date of Patent: Oct. 18, 2022

(54) IDENTITY REPRESENTED ASSETS IN A CONTENT MANAGEMENT SYSTEM

(71) Applicant: Microsoft Technology Licensing, LLC, Redmond, WA (US)

(72) Inventors: Michael J. Willard, Snohomish, WA (US); Chandrashekhar Chaudhari, Bothell, WA (US); Brian J. Shook, Redmond, WA (US); Allen L. Wagner, Kirkland, WA (US); Gleb Mazurovsky, Snoqualmie, WA (US); Dheeraj Kumar Jain, Sammamish, WA (US); Satish Kumar Gandham, Bothell, WA (US); Arvind Kumawat, Redmond, WA (US); Daniel J. Remesch, Newcastle, WA (US); Richa Gupta, Redmond, WA (US); Uma M. Nelluri, Woodinville, WA (US); Sourav Roy, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 16/837,567

(22) Filed: Apr. 1, 2020

(65) Prior Publication Data
US 2021/0081361 A1    Mar. 18, 2021

Related U.S. Application Data

(60) Provisional application No. 62/902,356, filed on Sep. 18, 2019.

(51) Int. Cl.
*G06F 16/00* (2019.01)
*G06F 16/17* (2019.01)
(Continued)

(52) U.S. Cl.
CPC .......... *G06F 16/173* (2019.01); *G06F 16/908* (2019.01); *G06F 16/909* (2019.01); *G06F 16/9024* (2019.01); *G06F 40/58* (2020.01)

(58) Field of Classification Search
CPC .. G06F 16/173; G06F 16/9024; G06F 16/908; G06F 16/909; G06F 40/58;
(Continued)

(56) References Cited

U.S. PATENT DOCUMENTS 6,282,548 B1 * 8/2001 Burner .................. G06F 16/958
707/999.005
7,225,222 B1 * 5/2007 Lu ........................... G06F 9/454
715/205
(Continued)

FOREIGN PATENT DOCUMENTS

WO     WO-2008028733 A1 *   3/2008    ....... G06F 17/30896

OTHER PUBLICATIONS

"Non Final Office Action Issued in U.S. Appl. No. 16/837,989", dated Sep. 7, 2021, 13 Pages.
"Content Delivery API", Retrieved From https://www.contentful.com/developers/docs/references/content-delivery-api/, Retrieved on Sep. 17, 2019, 26 Pages.
(Continued)

*Primary Examiner* — Syed H Hasan (57) ABSTRACT

Systems and methods receive an asset identification and one or more criterion to at least one of a locale, a market, a target, or an experiment and process a graph having a plurality of sub-graphs to define an asset having one or more desired variants. The asset is then published having the one or more desired variants. Multiple entities are represented as a single entity, which can be used for localization of the asset (e.g., image, video, custom data) or pages. By associating one entity (e.g., an image) across all variations of the entity, the needed storage space for the plurality of assets (e.g., images or videos) is reduced.

20 Claims, 7 Drawing Sheets

300

| PARTITION KEY | ID | DOCUMENT ID | CONTAINER | DOCUMENT TYPE | LOCALES | MARKETS | TARGETS | EXPERIMENTS | TO VERTICES | SCOPES | VERTEX TYPES | RECORD TYPE |
|---|---|---|---|---|---|---|---|---|---|---|---|---|
| IDNAA123 | AA123-MAIN | AA123 | MAIN | IVPB | | | | | | | PROPERTY BAG | MAPPING |
| IDNAA123 | AA123-MAIN | AA124 | MAIN | IMAGE VARIANT | EN-US,EN-GB | | | | [{AA125,IFD}] | | VARIANT | MAPPING |
| IDNAA123 | AA123-MAIN | AA126 | MAIN | IMAGE VARIANT | EN-CA | | | | [{AA125,IFD}] | | VARIANT | MAPPING |
| IDNAA123 | AA123-MAIN | AA128 | MAIN | IMAGE VARIANT | DA-DA | | | | [{AA129,IFD}] | | VARIANT | MAPPING |
| IDNAA123 | AA123-MAIN | AA130 | MAIN | IMAGE VARIANT | DA-DA | | | a,b | [{AA129,IFD}] | | VARIANT | MAPPING |
| IDNAA123 | AA123-MAIN | AA125 | MAIN | IFD | EN-US,EN-GB | | | | | | ARTIFACT | MAPPING |
| IDNAA123 | AA123-MAIN | AA129 | MAIN | IFD | | | | | | | ARTIFACT | MAPPING |

(51) Int. Cl.
*G06F 16/908* (2019.01)
*G06F 40/58* (2020.01)
*G06F 16/901* (2019.01)
*G06F 16/909* (2019.01)

(58) Field of Classification Search
CPC ...... G06F 16/958; G06F 40/131; G06F 40/14; G06F 40/157; G06F 40/197; G06Q 10/067
See application file for complete search history.

(56) References Cited

U.S. PATENT DOCUMENTS

| | | | |
|---|---|---|---|
| 9,087,361 B2 | 7/2015 | Mirra et al. | |
| 9,152,616 B2 | 10/2015 | Ying et al. | |
| 9,152,728 B2 | 10/2015 | Schultz et al. | |
| 9,396,167 B2 | 7/2016 | Doll et al. | |
| 9,424,333 B1 | 8/2016 | Bisignani et al. | |
| 9,792,354 B2 | 10/2017 | Olenick et al. | |
| 11,126,644 B2* | 9/2021 | Lipka | G06F 40/134 |
| 2002/0103826 A1* | 8/2002 | Kriho | G06F 16/93 715/225 |
| 2004/0123244 A1 | 6/2004 | Campbell et al. | |
| 2005/0203718 A1 | 9/2005 | Carek et al. | |
| 2008/0167886 A1* | 7/2008 | Marcken | G06Q 10/10 705/5 |
| 2009/0112575 A1 | 4/2009 | Sakashita et al. | |
| 2009/0204582 A1* | 8/2009 | Grandhi | G06F 16/1873 |
| 2010/0076947 A1* | 3/2010 | Kurapat | G06F 16/2228 707/706 |
| 2010/0274804 A1* | 10/2010 | Muskal | G06F 16/951 707/769 |
| 2011/0022603 A1 | 1/2011 | Khader et al. | |
| 2013/0117657 A1 | 5/2013 | Verlaan et al. | |
| 2015/0066695 A1 | 3/2015 | Delingat et al. | |
| 2015/0127677 A1* | 5/2015 | Wang | G06F 16/245 707/769 |
| 2015/0324336 A1 | 11/2015 | Glezos et al. | |
| 2018/0239810 A1 | 8/2018 | Pruitt et al. | |
| 2018/0307683 A1* | 10/2018 | Lipka | G06F 9/454 |
| 2020/0012623 A1 | 1/2020 | Cole et al. | |
| 2021/0081606 A1 | 3/2021 | Willard et al. | |

OTHER PUBLICATIONS

"Finding Metadata Values", Retrieved From https://web.archive.org/web/20190619131106/https://developer.apple.com/documentation/avfoundation/media_assets_playback_and_editing/finding_metadata_values, Retrieved on Jun. 19, 2019, 3 Pages.

"Fragments", Retrieved From https://web.archive.org/web/20190729105945/https://developer.android.com/guide/components/fragments.html, Retrieved on Jul. 29, 2019, 41 Pages.

"Fusion Middleware Web User Interface Developer's Guide for Oracle Application Development Framework", Retrieved From https://web.archive.org/web/20111203070539/https://docs.oracle.com/cd/E17904_01/web.1111/b31973/af_reuse.htm. Retrieved on Dec. 3, 2011, 21 Pages.

"IResourceBundle", Retrieved From https://www.cs.vu.nl/~eliens/assets/flex3/langref/mx/resources/IResourceBundle.html, Feb. 15, 2008, 4 Pages.

"Templates", Retrieved From https://helpx.adobe.com/in/experience-manager/6-4/sites/developing/using/templates.html. May 17, 2018, 6 Pages.

"Understanding Content Fragments and Experience Fragments in AEM", Retrieved From https://docs.adobe.com/content/help/en/experience-manager-learn/sites/content-fragments/understand-content-fragments-and-experience-fragments.html, Apr. 13, 2019, 6 Pages.

Shivakumar, Shailesh Kumar., "Enterprise Content and Search Management for Building Digital Platforms", In Publications of John Wiley & Sons, Dec. 16, 2016, pp. 126-128.

Singh, Nitish, "Localization Strategies for Global E-Business", Publication by Cambridge University Press, Nov. 24, 2011, 345 Pages.

Zdravev, et al., "Localized Learning Objects Metadata Enrichment through Cyrillic Transliteration", In Proceedings of the 2nd International Conference on e-Learning, Sep. 29, 2011, pp. 136-143.

"Web content management system—Wikipedia", https://en.wikipedia.org/w/index.php?title=Web_content_management_system&oldid=904843524, Jul. 4, 2019, 5 Pages.

"International Search Report and Written Opinion Issued in PCT Application No. PCT/US2020/038255", dated Aug. 17, 2020, 14 Pages.

"International Search Report and Written Opinion Issued in PCT Application No. PCT/US2020/038256", dated Aug. 17, 2020, 12 Pages.

"Final Office Action Issued in U.S. Appl. No. 16/837,989", Mdated Jan. 28, 2022, 14 Pages.

"Non Final Office Action Issued in U.S. Appl. No. 16/837,989", dated May 6, 2022, 16 Pages.

* cited by examiner

| PARTITION KEY | ID | DOCUMENT ID | CONTAINER | DOCUMENT TYPE | LOCALES | MARKETS | TARGETS | EXPERIMENTS | TO VERTICES | SCOPES | VERTEX TYPES | RECORD TYPE |
|---|---|---|---|---|---|---|---|---|---|---|---|---|
| IDNAA123 | AA123-MAIN | AA123 | MAIN | IVPB | | | | | | | PROPERTY BAG | MAPPING |
| IDNAA123 | AA123-MAIN | AA124 | MAIN | IMAGE VARIANT | EN-US,EN-GB | | | | [{AA125,IFD}] | | VARIANT | MAPPING |
| IDNAA123 | AA123-MAIN | AA126 | MAIN | IMAGE VARIANT | EN-CA | | | | [{AA125,IFD}] | | VARIANT | MAPPING |
| IDNAA123 | AA123-MAIN | AA128 | MAIN | IMAGE VARIANT | DA-DA | | | | [{AA129,IFD}] | | VARIANT | MAPPING |
| IDNAA123 | AA123-MAIN | AA130 | MAIN | IMAGE VARIANT | DA-DA | | | a,b | [{AA129,IFD}] | | VARIANT | MAPPING |
| IDNAA123 | AA123-MAIN | AA125 | MAIN | IFD | EN-US,EN-GB | | | | | | ARTIFACT | MAPPING |
| IDNAA123 | AA123-MAIN | AA129 | MAIN | IFD | | | | | | | ARTIFACT | MAPPING |

| PARTITION KEY | DOCUMENT ID | DOCUMENT ID | CONTAINER | DOCUMENT TYPE | LOCALES | MARKETS | TARGETS | EXP | TO VERTICES | SCOPES | VERTEX TYPE | RECORD TYPE |
|---|---|---|---|---|---|---|---|---|---|---|---|---|
| IDNAA123 | AA123-MAIN | AA123 | MAIN | VVPB | | | | | | | PROPERTY BAG | MAPPING |
| IDNAA123 | AA124-MAIN | AA124 | MAIN | VIDEO VARIANT | EN-US, EN-GB | | | | [{("AA126","VFD"),("AA127","CCFD"),("AA128","ATFD")}] | | VARIANT | MAPPING |
| IDNAA123 | AA125-MAIN | AA125 | MAIN | VIDEO VARIANT | EN-CA | | | | [{("AA126","VFD"),("AA129","CCFD"),("AA130","ATFD")},{("IDNAA139","IMAGEIDENTITY")}] | | VARIANT | MAPPING |
| IDNAA123 | AA126-MAIN | AA126 | MAIN | VFD | | | | | [{("IDNAA138","IMAGEIDENTITY")}] | | ARTIFACT | MAPPING |
| IDNAA123 | AA127-MAIN | AA127 | MAIN | CCFD | | | | | | | ARTIFACT | MAPPING |
| IDNAA123 | AA128-MAIN | AA128 | MAIN | ATFD | | | | | | | ARTIFACT | MAPPING |
| IDNAA123 | AA129-MAIN | AA129 | MAIN | CCFD | | | | | [{("AA126","VFD")}] | | ARTIFACT | MAPPING |
| IDNAA123 | AA130-MAIN | AA130 | MAIN | ATFD | | | | | [{("AA126","VFD")}] | | ARTIFACT | MAPPING |
| IDNAA123 | AA134-MAIN | AA134 | MAIN | VIDEO VARIANT | DA-DA | | | | [{("AA135","VFD"),("AA136","CCFD"),("AA137","ATFD")}] | | ARTIFACT | MAPPING |
| IDNAA123 | AA135-MAIN | AA135 | MAIN | VFD | | | | | [{("IDNAA140","IMAGEIDENTITY")}] | | ARTIFACT | MAPPING |
| IDNAA123 | AA136-MAIN | AA136 | MAIN | CCFD | | | | | | | ARTIFACT | MAPPING |
| IDNAA123 | AA137-MAIN | AA137 | MAIN | ATFD | | | | | | | ARTIFACT | MAPPING |
| IDNAA123 | AA141-MAIN | AA141 | MAIN | VIDEO VARIANT | DA-DA | | A,B | | [{("AA135","VFD"),("AA142","CCFD"),("AA143","ATFD")}] | | ARTIFACT | MAPPING |
| IDNAA123 | AA142-MAIN | AA142 | MAIN | CCFD | | | | | [{("AA135","VFD")}] | | ARTIFACT | MAPPING |
| IDNAA123 | AA143-MAIN | AA143 | MAIN | ATFD | | | | | [{("AA135","VFD")}] | | ARTIFACT | MAPPING |

IDENTITY REPRESENTED ASSETS IN A CONTENT MANAGEMENT SYSTEM

CROSS-REFERENCE TO RELATED APPLICATION

This nonprovisional application claims the benefit of and priority to U.S. Provisional Application No. 62/902,356, entitled "Identity Represented Assets In A Content Management System", filed Sep. 18, 2019, which is incorporated by reference herein in its entirety.

BACKGROUND

Digital content, including any type of digital information that is used to populate a document, a document page, a web page, etc. can be presented in different variations (e.g., in different languages). The digital data can be text, images, graphics, video, sound etc. A content management system (CMS) provides control to manage this digital content by combining rules, processes and/or workflows in such a way that decentralized authors/editors can create, edit, manage and publish all the content of a document or web pages.

However, conventional CMSs do not provide for content association across different variations of the content, such as across different locales (e.g., different language locales). That is, content items in one locale do not get associated in other locales. If the developers desire to publish a website that appeals to a global population, such that the content is "localized" to be readable and acceptable by the various cultures of the world, the process of localization usually requires creating a separate set of content for each culture or writing some code to modify the content of each page for a specific culture. The difficulty in implementing this process is compounded when pages generated by the website are to be generated automatically.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more examples, a computerized method receives one or more criterion corresponding to a desired asset and traverses a graph of documents during runtime corresponding to an identity represent asset to generate the desired asset. The graph traversal selects one or more variants for the desired asset based on the received one or more criterion, and the desired asset is published. In some examples, the graph of documents comprises a plurality of nodes corresponding to a plurality of assets and a plurality of sub-graphs corresponding to at least one of the plurality of nodes to define an identity represented asset. The plurality of sub-graphs define a plurality of variants for the identity represented asset to associate the sub-graphs with the identity represented asset. The asset is published having the one or more variants Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to provide identity represented assets in a CMS, such as across different variations (also referred to as variants) of the associated content (e.g., across different language locales). Multiple entities are represented as a single entity in some examples, which can be used for localization of an asset (e.g., image, video, custom data) or pages. By associating one entity (e.g., an image) across all variations of the entity, the needed storage space for a plurality of assets (e.g., images or videos) is reduced.

For example, and with respect to an image, the image metadata can be localized into many locales, as well as the binary (the actual image). With the present disclosure, a user in the system can view an image and all localized variations of the image without having to access a separate asset for each of the localized variations. As a result of providing identity represented assets and performing the operations described herein, processing time and processing resources are reduced. In this manner, when a processor is programmed to perform the operations described herein, the processor is used in an unconventional way, and allows, for example, for the more efficient localization of the asset.

Various examples provide a grouping mechanism that can be used for a variety of applications where multiple versions of a similar file, content, or asset may be desired, wherein a group comprises a global identifier for the group, members of the group, and metadata for the group members that describes various attributes about when the members of the groups should be used. The metadata is stored separately from associated group members. In some examples, metadata can be used in planning language asset or resource localization test cases.

The present disclosure enables, for example, when a group is invoked requesting an asset, tags to be passed to identify the appropriate member of the group to provide localization of images of a webpage (or other portions), such as different image files that address legal requirements for advertising (e.g., blood in videogames), and assigning a default asset or prioritized assets for when no tags are passed or when multiple assets meet a specification. By linking assets together, dynamic localization of content allows for dynamically creating assets (e.g., web pages) having localized content. It should be noted that the system is not limited to the web space. For example, the system of various examples can be integrated with any type of runtime object such that content can be localized in accordance with a client request.

Using identity represented assets and mapping, links are created in a logical mapping. Different properties can be used to render the content, for example, colors, music, graphics, languages, and the like that are tailored for a particular culture in some examples. Tailoring the content for a particular culture allows the rendered content to be more pleasing, understandable, and the like, to consumers of the localized content, thus enhancing the effectiveness of the publication of the rendered page.

In one example, each localized identity in a platform has a "table" in a database (e.g., document database) that maps criteria to a specific variant and its underlying graph within boundaries of an identity (e.g., each row of the mapping table is represented by a JavaScript Object Notation (JSON) document in the database partition with an identity identification (ID) as the partition ID). The underlying graph is represented in the table by representing each edge of the graph as one row in the table. For example, in an image identity graph, an image variant document has a link to an image file data document. Hence, a mapping row exists for each of the documents with the image variant document row having additional information to indicate the external edge to the image file data document row. This minimal mapping contains all such edges that go out of variants and into the identity.

In one example, the criteria has four fields: locales, markets, targets and experimentations. At least one field is specified in various examples. Additionally, an identity boundary is defined as any artifact/content that explicitly specifies that the artifact/content belongs to an identity and will be inside of the boundary of the identity. This is done by adding a special type of "identity" link in a links section of the artifact/content document (e.g., "cms/api/am/identity/IDNRE2IOGI means that the document is within identity IDNRE2IOGI boundary). All other artifact/content that is referenced by an identity's artifacts, but not explicitly specifying that the other artifact/content belongs to the artifact/content, will be outside of the boundary of the identity.

In one example, each row of the mapping table includes one or more fields, including, without limitation:

1. ID—ID of each row in the mapping table that uniquely identifies the row;

2. Document ID—the ID of the document to which the table row belongs;

3. Criteria—localization variation criteria. Variations of the criteria include:

locales—list of locales that is part of the criteria that maps to a variant;

markets—list of markets (e.g., geo-mapping) that is part of the criteria that maps to a variant;

targets—list of targets that is part of the criteria that maps to a variant (e.g., free form set of stings—Xbox user or male user);

experiments—list of experiments that is part of the criteria that maps to a variant for different combinations; and 4. Custom—user defined criteria.

The mapping table also contains edges that include a from id node that is inside of the boundary of the identity and a to_id node that is outside of the boundary of the identity. This includes two possible links: an identity artifact referencing another identity and an identity artifact referencing shared content. For artifacts outside of the identity, a mapping row does not exist in the identity partition. It should be noted that a criteria field is populated with records that are of a variant type.

As an example, the variant criteria can be defined as follows:

locales: en-us, en-ca;

market: US;

target: Xbox gold, Xbox silver; and experiment: A, B.

For graph traversal, any one of three match types can be used:

1. Partial—when a variant has any of the requested criteria. For example, the above variant would be a match for "locale=en-us AND market=GB" as the locale matches with one of the locales of the variant.

2. Full—when a variant has all the requested criteria. For example, the above variant would be a match for "locale=en-us AND market=US AND experiment=A" as all three requested variations are present in the variant.

3. Exact—when a variant has only and only the requested criteria. For example, the above variant would be a match for "locale=en-us AND market=US AND target=Xbox gold AND experiment=A" but not for "locale=en-us AND market=US AND target=Xbox gold". Hence for "Exact" match, an "OR" is used for entries in the same field and "AND" is used between different fields of the criteria during the select. For any non-specified field from the criteria, an emptiness of that field will be checked while matching.

It should be noted that the identity ID partition has an additional table that contains history information in some examples. The entries in this table will be maintained for the same cases as maintained in the changeset history, adding artifacts, removing artifacts, etc.

In some examples, a property bag and associated properties are provided. In one example, there is an ask to provide a property bag that is on an identity level. This is accomplished by adding an additional artifact on a VP level that will be the property bag document. This can be used to add any properties that are common identity wide. At the same time, some other identity properties are provided by the platform itself (referred to as virtual properties). In order to be able to use both in indexing (searching), the identity virtual properties are indexed along with the information from the property bag. To achieve the information from the property bag document being merged with identity virtual properties, this merged document is indexed. Separate special indices are used (e.g., ID for documents and ID for publishing) in some examples. The data from the property bag document are available in the regular index as well. The property bag is a document type in the CMS in some examples. One of the fields of this type is identity properties, that is, the field into which the identity system generated properties will be merged.

An additional table contains system properties of an identity (virtual properties). In one example, the following system properties are provided:

1. VariantType—global property as an identity can have only one type of variant1.

2. PropertyBagId—global property as only one property bag artifact per identity.

3. PropertyBagType—global property as only one property bag artifact per identity.

4. LastModifiedTime—last modified time for any identity mapping operation. This is specific to changeset as a variant/artifact operations are changeset specific.

5. Etag—Etag for identity mappings per changeset. Specific to changeset as a variant/artifact operations are changeset specific.

Figure 1:
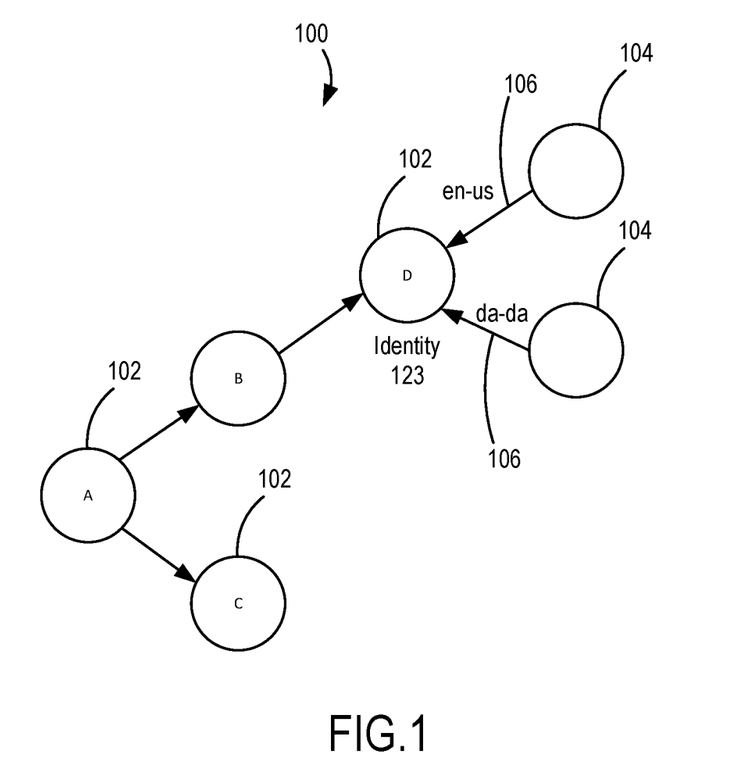
FIG. 1 illustrates a graph structure according to an implementation.

In some examples, in operation, the above-described examples are implemented as follows. A directed graph 100 of documents as illustrated in FIG. 1 is traversed at runtime to generate code to render the localized content (e.g., localized page). The graph 100 includes a plurality of nodes 102 representing Pages A, B, C, and D, with Page D in this example having a corresponding identity (defining an identity represented asset represented by Identity 123). In this example, and for ease in explanation, the graph corresponding to Page D has two sub-graphs corresponding to nodes 104 associated with different locales (e.g., en-en and da-da). That is, Page D has two reverse links 106 associated therewith that allows for selection of a sub-graph corresponding to different locales, such that the entire graph 100 does not have to be traversed for each of the different variants. As should be appreciated, many additional sub-graphs can be associated with Page D corresponding to different criteria as described herein. Thus, in this example, different versions are thereby available for Page D, such that the graph 100 points to both different versions represented by nodes 104. A more efficient workflow process also results, such as by allowing different versions to be generated and added to the graph 100 at different times (e.g., publishing dependencies at different times).

The present disclosure can also evaluate criteria at edges of the graph 100 to determine if additional information is needed. In various examples, the identity creates a set of variants for a particular object of a particular type (e.g. identity of a type of image). For example, the English and German versions that belong to the same set can be logically associated and evaluated at the edge of the graphs 100 to determine if the particular version is needed to complete the graph 100. As such, combinations of characteristics for each of the nodes can be evaluated, such as during localization. The graph is not changed in various examples (e.g., the graph ID is not changed as variations are added).

Figure 2:
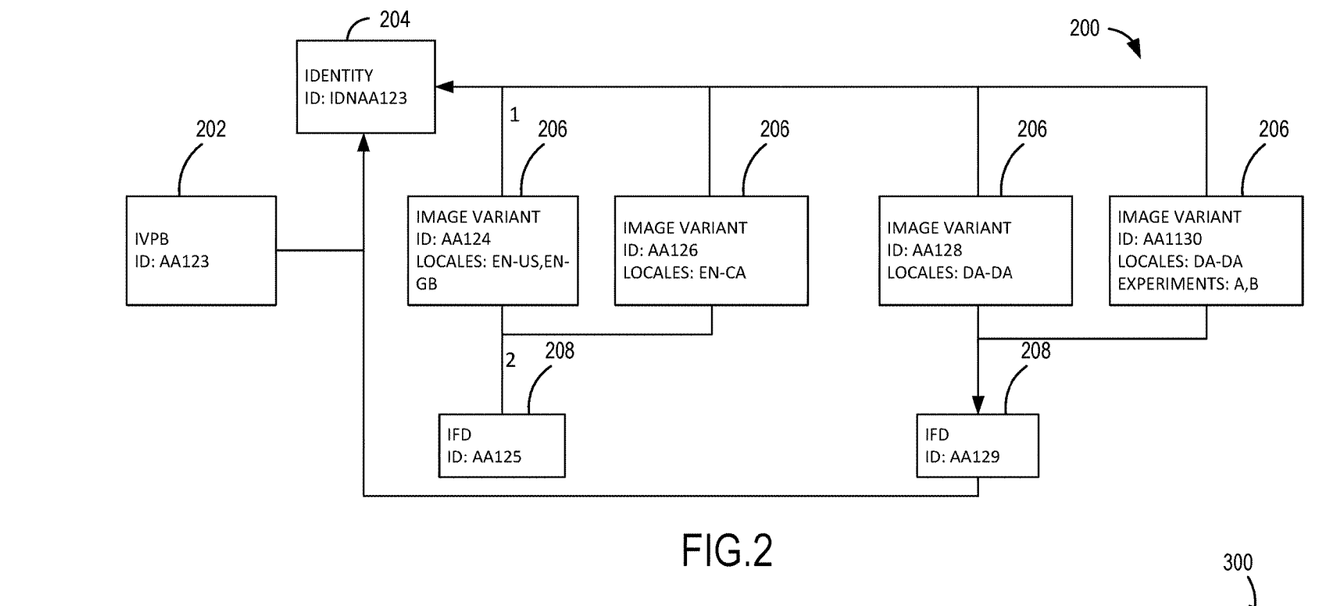
FIG. 2 illustrates an image mapping according to an implementation.

Various mapping examples will now be described. FIG. 2 shows a graph 200 (illustrated as a tree structure) corresponding to rendering an image 202 corresponding to an identity 204 that is defined by one or more criterion, wherein image variants 206 exist for each of a plurality of different locales. In this example, the image variants 206 define variations to the image corresponding to a particular locale that are mapped by the graph 200 (e.g., a graph of documents). One or more of the variants 206 are associated with a corresponding image file 208 that links to an image. As should be appreciated, different sets of variants 206 are associated with different image files 208. Additional or fewer variants 206 can be associated with each of the image files 208. That is, as can be seen, each image file 208 has a plurality of variants 206 associated therewith unlike conventional approaches that provide a different image file 208 for each variant.

Figure 3:
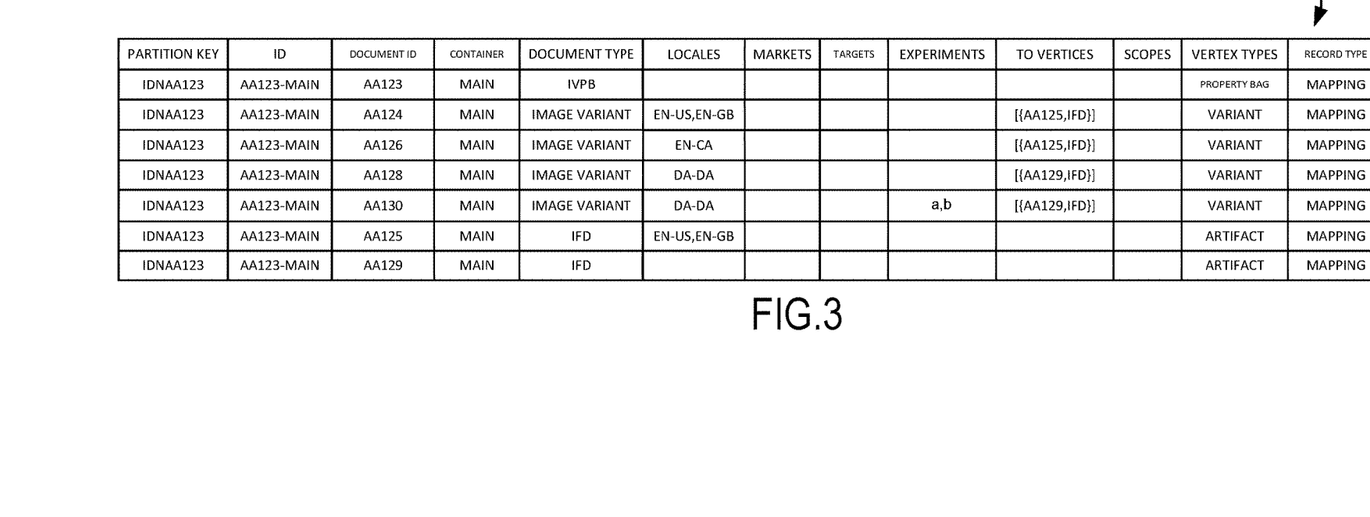
FIG. 3 is a table that defines properties of the mapping of FIG. 3.

It should be noted that the properties of the graph 200 are defined in this example by a table 300 as illustrated in FIG. 3. Thus, as the graph 200 is traversed or parsed at runtime, the desired image file 208 is selected based on defined criteria, such as locale. For example, using a single logical ID in combination with one or more criterion (e.g., variant criterion), the desired image file 208 is selected. As described herein, when reaching a node with an identity represented asset, the most relevant identity is selected in some examples based on the one or more criterion (e.g., if one criterion or more than one criterion needs to be matched).

Figure 4:
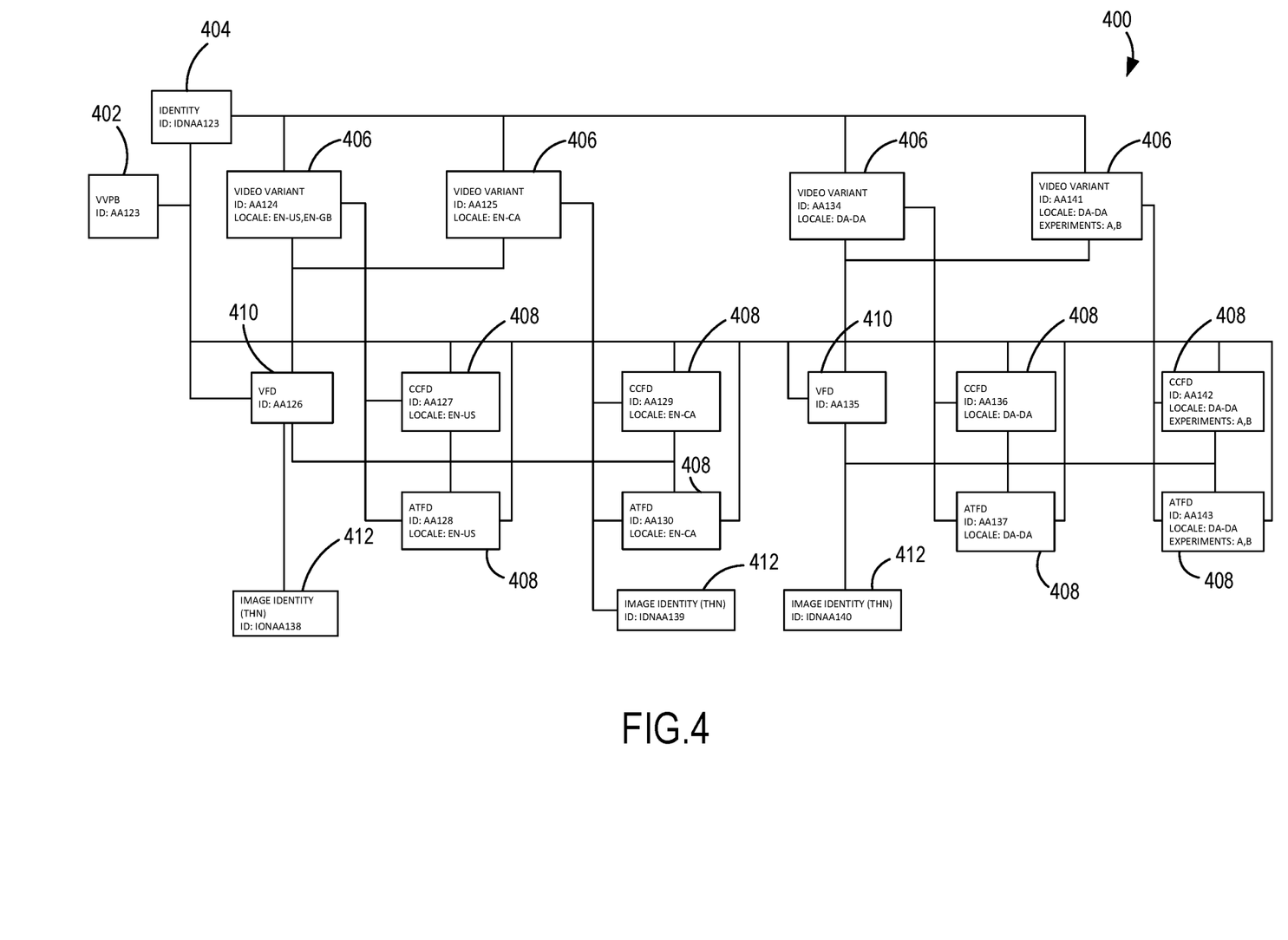
FIG. 4 illustrates a video mapping according to an implementation.

FIG. 4 shows a graph 400 (illustrated as a tree structure) corresponding to rendering a video 402 corresponding to an identity 404 defined by one or more criterion, wherein video variants 406 exist for each of a plurality of different locales. In this example, the video variants 406 define variations to the video corresponding to a particular locale that are mapped by the graph 400 (e.g., a graph of documents). One or more of the variants 406 are associated with different video features 408 (e.g., different closed captioning, different audio, or different video features such as different country flag flipping in the wind) that define other variants (e.g., sub-variants for the particular variant 406). A corresponding video ID 410 then links to a video file 412. As should be appreciated, different sets of variants 406 are associated with different video files 412 that have different video features 408. Additional or fewer variants 406 can be associated with each of the video files 412. That is, as can be seen, each video file 412 has a plurality of variants 406 (with corresponding video features 408) associated therewith unlike conventional approaches that provide a different video file 412 (with fixed video features 408) for each variant. The variants 406 are defined such that all the variants 406 participate in the set defined by the graph 400. It should be noted that identities can be locked in the various examples so that conflicting variants cannot be created.

Figure 5:
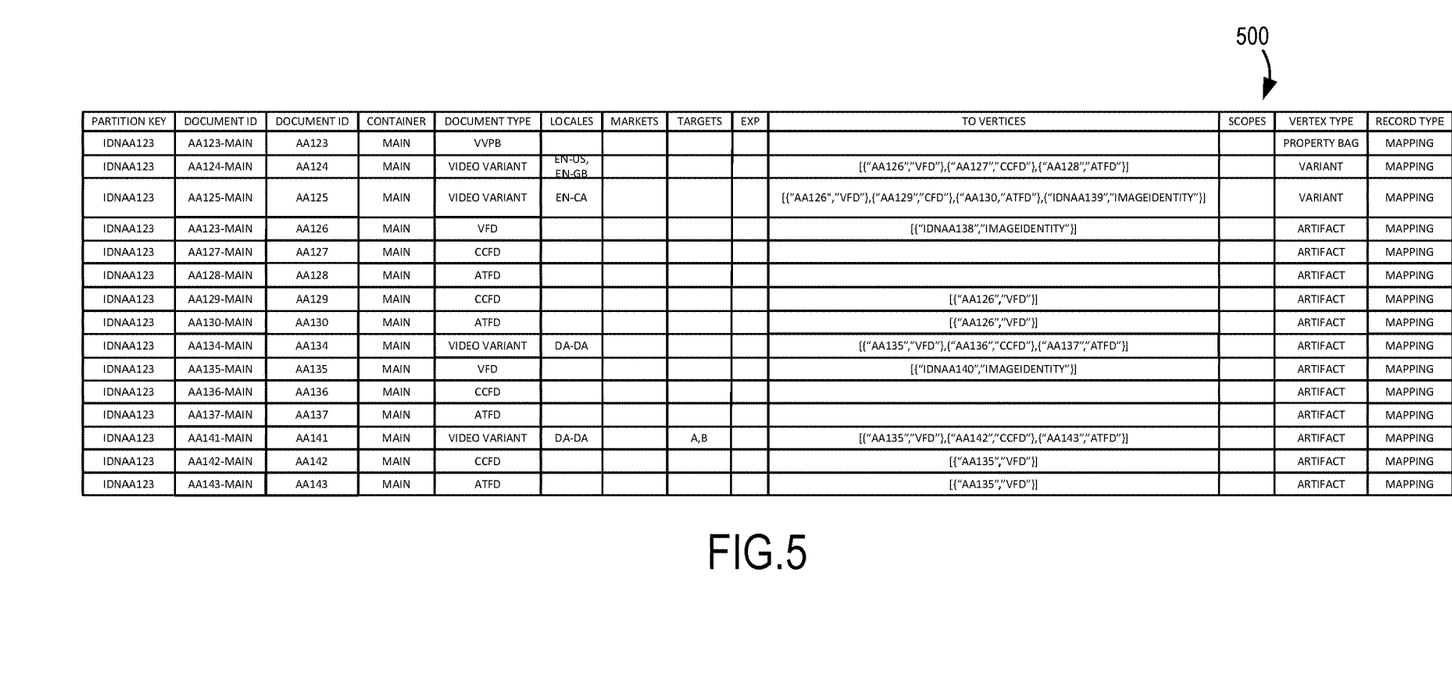
FIG. 5 is a table that defines properties of the mapping of FIG. 4.

It should be noted that the properties of the graph 400 are defined in this example by a table 500 as illustrated in FIG. 5. Thus, as the graph 400 is traversed or parsed at runtime, the desired video file 412 is selected based on defined criteria, such as locale. For example, using a single logical ID in combination with one or more criterion, the desired video file 412 is selected. As described herein, when reaching a node with an identity represented asset, the most relevant identity is selected based on the one or more criterion.

Thus, using a single logical ID, instead of a plurality of exact physical IDs, the present disclosure is able to reduce the number of assets (e.g., image files or video files) by associating the assets with a plurality of different variants that are selected based on one or more criterion. As a result, the correct asset is selected at runtime instead of having to perform this selection during design time. That is, by decoupling the physical ID from a single asset file, a reduced number of files are needed. Moreover, new assets can be added based on the identity, which does not affect the flow of the other assets.

In some examples, by using a mapping table that defines an internal graph of the one or more identities, the correct asset is selected based on defined input criteria. As described herein, one or more sub-graphs are defined by the variants and that correspond to different criteria. In one example, sub-graphs are provided for each of the different identities and that allows for grouping together different variants of images, videos, etc., such as corresponding to different locales (e.g., different languages). As such, a single entity with different variants is thereby defined. Thus, the present disclosure provides content association using logical mapping that is not provided by conventional CMSs that require a different entity (e.g., for each image, pages, etc.), which results in significant duplication in conventional CMSs. With the present disclosure, a single entity is defined in different ways, for example, a ribbon at the top of a homepage is localized depending on the locale using the single entity.

It should be noted that variations are contemplated, such as using image cropping and focal point selection. For example, websites often display the same image in a number of different ways and in different views, for example on a large screen computer all the way to a small screen phone. Sometimes an image does not scale correctly and requires that a view of the image be made that will display correctly in every view. Image cropping and focal point selection (based on different identities as described herein) allows the image artist or the content builder to crop the image and to select the point of the images that will be centered (i.e., the focal point) for each of a plurality of variants (e.g., focus on eyes in experiment 1 and focus on body in experiment 2).

In operation, during runtime, the table corresponding to the logical asset ID is traversed based on one or more criterion. For example, when a localized image is requested by a client (it should be noted that the client does not have to be aware of the localization process), the desired image is selected based on the following: ID+criteria, which is a desired version or variant of the image, such as based on the particular locale. In some examples, criteria for the localization can be detected, such as by detecting an IP address used by a computer, tracing the IP address to a zip code, and informing the system of the zip code, and wherein one or more localized media assets are selected that correspond to the zip code based on a corresponding identity represented asset.

Figure 6:
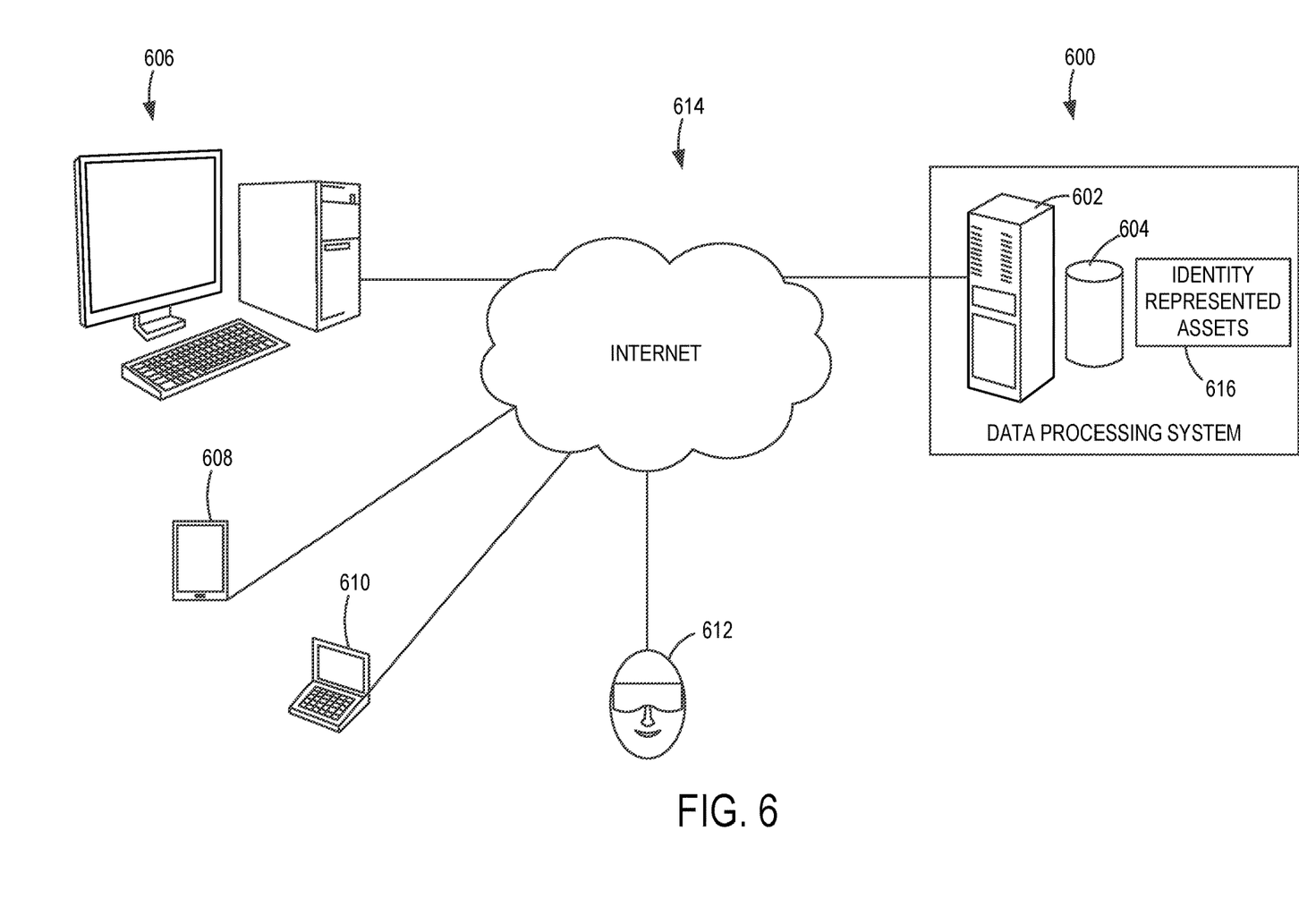
FIG. 6 is an exemplary schematic block diagram of a data processing system that includes content management according to an implementation.

The identity represented asset arrangement and corresponding processes described herein to select a desired asset can be implemented in a data processing system 600 (e.g., a CMS) deployed as a cloud service as illustrated in FIG. 6. In this example, the data processing system 600 implements the localization process described herein to allow for a reduced number of assets to be stored. The data processing system 600 includes one or more computers 602 and storage 604 to store, for example, image or video data. It should be appreciated that other assets can be stored in the storage 604 and processed by the one or more computers 602 using the present disclosure.

The data processing system 600 is connected to one or more end user computing devices in some examples, such as a desktop computer 606, a smart phone 608, a laptop computer 610 and an augmented reality head worn computer 612 (e.g., Microsoft HoloLens®). For example, the data processing system 600 is shown as connected to the end user computing devices via a computer network 614, illustrated as the Internet.

The data processing system 600 receives input data, such as asset ID data and one or more criterion (e.g., locale, market, target, and/or experimentation) from an end user computing device or server. The data is uploaded to the data processing system 600 for processing, such as for asset selection processing with operations using graphs and subgraphs as described herein, which include identity represented assets 616. It should be appreciated that some or all of the data processing system 600 or the functionality of the data processing system 600 can be implemented within the end user computing device.

In some examples, the functionality of the data processing system 600 described herein is performed, at least in part, by one or more hardware logic components. For example, and without limitation, illustrative types of hardware logic components that are used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 7:
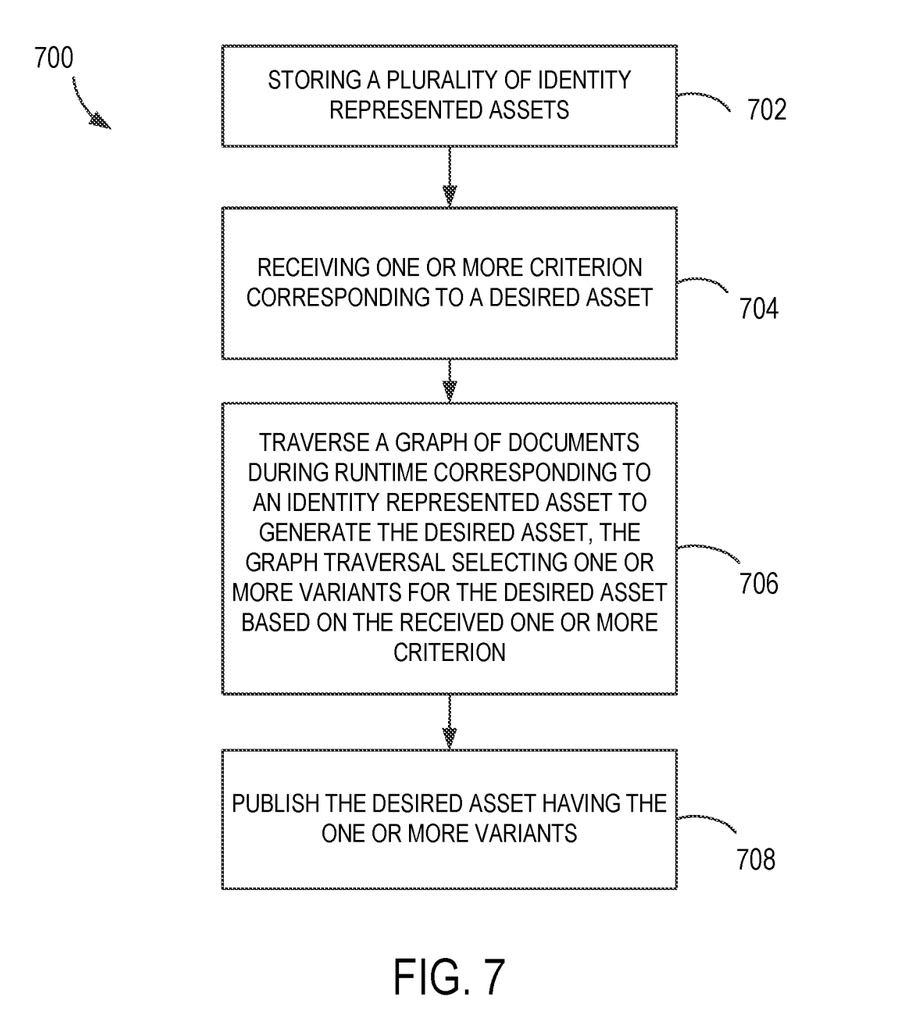
FIG. 7 is a flowchart of a process for associating an entity across variations of the entity according to an implementation.

FIG. 7 is a flowchart 700 illustrating operations involved in associating an entity across variations of the entity. In some examples, the operations described for flowchart 700 are performed by the computing device 800 of FIG. 8. With the flowchart 700, identity represented assets are provided, such as across different variations of the associated content (e.g., across different language locales).

More particularly, the flowchart 700 commences at operation 702 with storing a plurality of identity represented assets. For example, multiple entities are represented as a single entity in some examples, which can be used for localization of an asset (e.g., image, video, custom data) or pages. In one example, and with respect to an image, the image metadata can be localized into many locales, as well as the binary (the actual image). A grouping mechanism as described herein can be used for a variety of applications where multiple versions of a similar file, content, or asset may be desired, wherein a group comprises a global identifier for the group, members of the group, and metadata for the group members that describes various attributes about when the members of the groups should be used. In one example, using identity represented assets and mapping, links are created in a logical mapping. Different properties can be used to render the content, for example, colors, music, graphics, languages, and the like that are tailored for a particular culture in some examples.

At operation 704, one or more criterion corresponding to an asset (e.g., a localized version of an image) are received. As describe herein, in one example, the one or more criterion include: locales, markets, targets and experimentations, with at least one fields specified by the received one or more criterion. For example, the location or search entered by a user can define a locale or target criterion. The one or more criterion are used in some examples to define fields for traversing a table. That is, at operation 706 a graph of documents is traversed during runtime corresponding to an identity represented asset to generate the desired asset. The graph traversal selects one or more variants for the desired asset based on the received one or more criterion and as defined and located by the one or more fields.

For example, each localized identity in a platform has a "table" in a database (e.g., document database) that maps criteria to a specific variant and its underlying graph within boundaries of an identity as described herein. The underlying graph is represented in the table by representing each edge of the graph as one row in the table. For example, in an image identity graph, an image variant document has a link to an image file data document as described herein. Moreover, one or more match types can be used as described herein, such as partial, full, or exact matching.

Additionally, as described herein, a group can be invoked requesting an asset, tags to be passed to identify the appropriate member of the group to provide localization of images of a webpage (or other portions), such as different image files that address legal requirements for advertising (e.g., blood in videogames), and assigning a default asset or prioritized assets for when no tags are passed or when multiple assets meet a specification. By linking assets together, dynamic localization of content allows for dynamically creating assets (e.g., web pages) having localized content. That is, at operation 708, the desired asset is published having the one or more variants, For example, with the desired asset published, a user can view an image and all localized variations of the image without having to access a separate asset for each of the localized variations. Thus, for example, the desired asset (e.g., image results from a search) can be published for display, such as an image having particular properties or characteristics that are more readily understandable by a user in the particular country. It should be noted that in some examples, the user is able to view the image and all localized versions of the image.

Thus, identity represented assets are provided in a CMS, wherein multiple entities are represented as a single entity, which can be used for localization of an asset (e.g., image, video, custom data) or pages.

Exemplary Operating Environment

Figure 8:
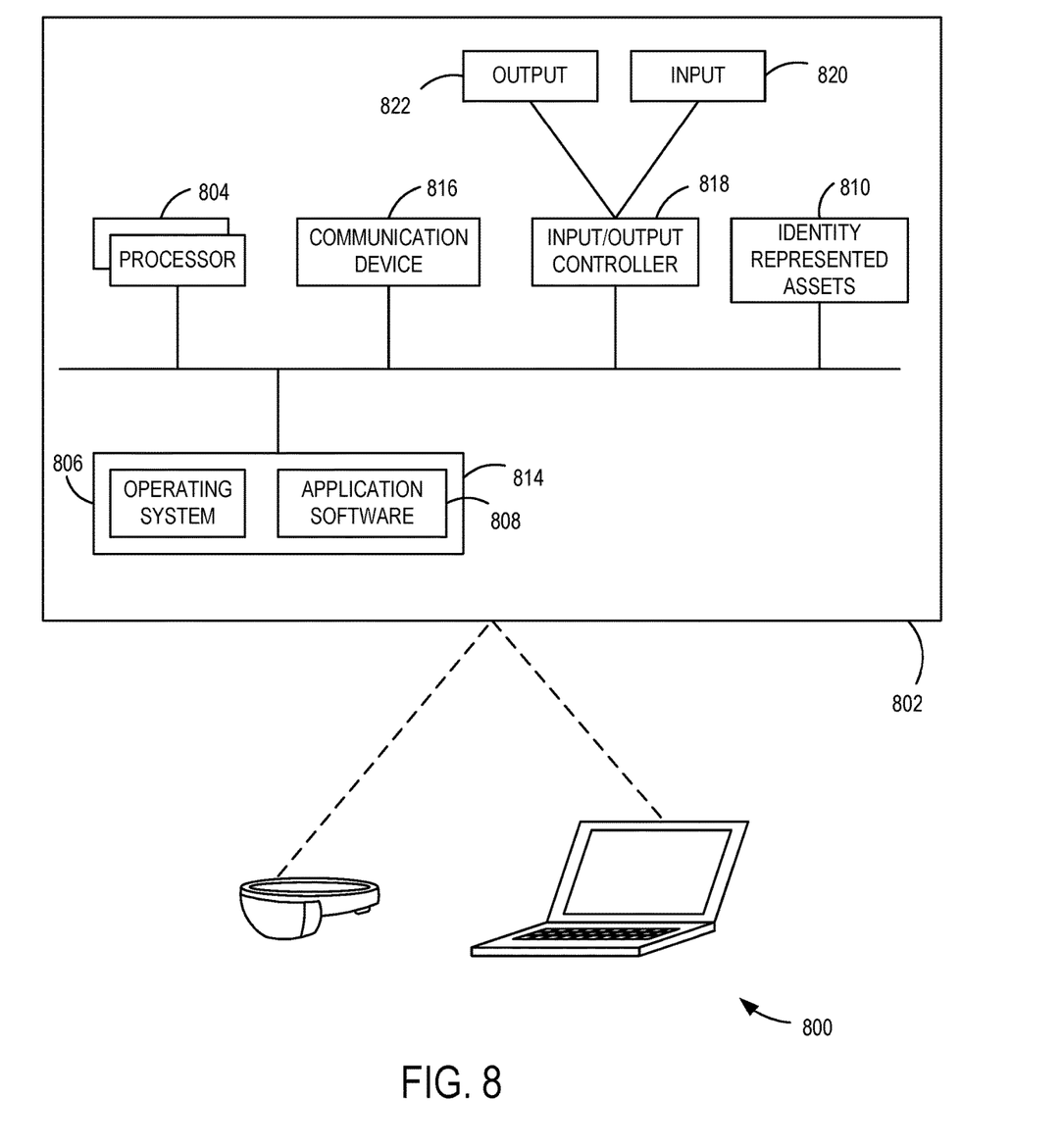
FIG. 8 illustrates a computing apparatus according to an implementation as a functional block diagram.

The present disclosure is operable with a computing apparatus 802 according to an embodiment as a functional block diagram 800 in FIG. 8. In one example, components of the computing apparatus 802 may be implemented as a part of an electronic device according to one or more embodiments described in this specification. The computing apparatus 802 comprises one or more processors 804 which may be microprocessors, controllers or any other suitable type of processors for processing computer executable instructions to control the operation of the electronic device. Platform software comprising an operating system 806 or any other suitable platform software may be provided on the apparatus 802 to enable application software 808 to be executed on the device. According to an embodiment, localization operations using identity represented assets 810 can be accomplished by software.

Computer executable instructions may be provided using any computer-readable media that are accessible by the computing apparatus 802. Computer-readable media may include, for example, computer storage media such as a memory 814 and communications media. Computer storage media, such as the memory 814, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 814) is shown within the computing apparatus 802, it will be appreciated by a person skilled in the art, that the storage may be distributed or located remotely and accessed via a network or other communication link (e.g. using a communication interface 816).

The computing apparatus 802 may comprise an input/output controller 818 configured to output information to one or more input devices 820 and output devices 822, for example a display or a speaker, which may be separate from or integral to the electronic device. The input/output controller 818 may also be configured to receive and process an input from the one or more input devices 820, for example, a keyboard, a microphone or a touchpad. In one embodiment, the output device 822 may also act as the input device 820. An example of such a device may be a touch sensitive display. The input/output controller 818 may also output data to devices other than the output device 822, e.g. a locally connected printing device. In some embodiments, a user may provide input to the input device(s) 820 and/or receive output from the output device(s) 822.

In some examples, the computing apparatus 802 detects voice input, user gestures or other user actions and provides a natural user interface (NUI). This user input may be used to author electronic ink, view content, select ink controls, play videos with electronic ink overlays and for other purposes. The input/output controller 818 outputs data to devices other than a display device in some examples, e.g. a locally connected printing device.

The functionality described herein can be performed, at least in part, by one or more hardware logic components. According to an embodiment, the computing apparatus 802 is configured by the program code when executed by the processor(s) 704 to execute the embodiments of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A system for content management, the system comprising:
- at least one processor;
- storage storing a plurality of identity represented assets; and
- at least one memory comprising computer program code, the at least one memory and the computer program code configured to, with the at least one processor, cause the at least one processor to:
  - receive one or more criterion corresponding to a desired asset;
  - traverse a graph of documents during runtime corresponding to an identity represented asset to generate the desired asset, the graph traversal selecting one or more variants for the desired asset based on the received one or more criterion; and
  - publish the desired asset having the one or more variants.

A computerized method for asset publishing, the method comprising:
- receiving an asset identification and one or more criterion to at least one of a locale, a market, a target, or an experiment;
- processing a graph having a plurality of sub-graphs to define an asset having one or more desired variants to generate a desired asset, the graph being a graph of documents traversed during runtime corresponding to an identity represented asset defined by the asset identification and one or more criterion, the graph traversal selecting one or more variants for the desired asset based on the received one or more criterion; and
- publishing the asset having the one or more desired variants.

One or more computer storage media having computer-executable instructions for image processing that, upon execution by a processor, cause the processor to at least:
- receive one or more criterion corresponding to a desired asset;
- traverse a graph of documents during runtime corresponding to an identity represented asset to generate the desired asset, the graph traversal selecting one or more variants for the desired asset based on the received one or more criterion; and
- publish the desired asset having the one or more variants.

Alternatively, or in addition to the other examples described herein, examples include any combination of the following:
- wherein the one or more criterion comprises at least one of a locale, a market, a target, or an experiment;
- wherein traversing the graph comprises selecting nodes in a graph to localize the desired asset;
- associating an entity corresponding to the identity represented asset across a plurality of variants, wherein a plurality of entities are represented as a single entity to localize the desired asset;
- wherein the entity comprises one of an image or a video that is published in a language or having features defined by the one or more variants;
- localizing metadata corresponding to the identity represented asset;
- at rendering, publishing the identity represented asset, apply the one or more variants to an associated locale that is automatically selected based on the one or more criterion;
- traversing the graph to select nodes in the graph to localize the desired asset;
- wherein the graph comprises a graph of documents including a plurality of nodes corresponding to a plurality of assets and the plurality of sub-graphs corresponding to at least one of the plurality of nodes to define an identity represented asset, the plurality of sub-graphs defining a plurality of variants for the identity represented asset to associate the sub-graphs with the identity represented asset; and
- wherein a plurality of sub-graphs define reverse links in the graph.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 804 together with the computer program code stored in memory 814 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for content management, the system comprising:
   at least one processor;
   storage storing a plurality of identity represented assets, wherein a single entity corresponding to one of the plurality of identity represented assets represents a plurality of entities across a plurality of variants of the single entity; and
   at least one memory comprising computer program code, the at least one memory and the computer program code configured to, with the at least one processor, cause the at least one processor to:
   receive one or more criterion corresponding to a desired asset;
   traverse a graph of documents during runtime corresponding to the one of the plurality of identity represented assets to generate the desired asset, the graph traversal selecting one or more of the plurality of variants for the desired asset based on the received one or more criterion; and
   publish the desired asset having the one or more of the plurality of variants.

2. The system of claim 1, wherein the one or more criterion comprises at least one of a locale, a market, a target, or an experiment.

3. The system of claim 1, wherein traversing the graph of documents comprises selecting nodes in the graph of documents to localize the desired asset.

4. The system of claim 1, wherein the at least one memory and the computer program code configured to, with the at least one processor, further cause the at least one processor to use a single logical identifier in combination with the one or more criterion to select the one or more of the plurality of variants for the desired asset.

5. The system of claim 1, wherein the single entity comprises one of an image or a video that is published in a language or having features defined by the one or more of the plurality of variants.

6. The system of claim 1, wherein the at least one memory and the computer program code configured to, with the at least one processor, further cause the at least one processor to localize metadata corresponding to the plurality of identity represented assets.

7. The system of claim 1, wherein the at least one memory and the computer program code configured to, with the at least one processor, further cause the at least one processor to render the desired asset having the one or more of the plurality of variants to an associated locale that is automatically selected based on the one or more criterion.

8. A computerized method for asset publishing, the method comprising:
   storing a plurality of identity represented assets, wherein a single entity corresponding to one of the plurality of identity represented assets represents a plurality of entities across a plurality of variants of the single entity;
   receiving an asset identification and one or more criterion to at least one of a locale, a market, a target, or an experiment;
   processing a graph having a plurality of sub-graphs to define the one of the plurality of identity represented assets having the plurality of variants to generate a desired asset, the graph being a graph of documents traversed during runtime corresponding to the one of the plurality of identity represented assets defined by the asset identification and the one or more criterion, the graph traversal selecting one or more of the plurality of variants for the desired asset based on the received one or more criterion; and
   publishing the desired asset having the one or more of the plurality of variants.

9. The computerized method of claim 8, wherein processing the graph further comprises traversing the graph to select nodes in the graph to localize the desired asset.

10. The computerized method of claim 8, further comprising using a single logical identifier in combination with the one or more criterion to select the one or more of the plurality of variants for the desired asset.

11. The computerized method of claim 8, wherein the single entity comprises one of an image or a video that is published in a language or having features defined by the one or more of the plurality of variants.

12. The computerized method of claim 8, further comprising localizing metadata corresponding to the plurality of identity represented assets.

13. The computerized method of claim 8, wherein the publishing further comprises rendering the desired asset, including applying the one or more of the plurality of variants to an associated locale that is automatically selected based on the one or more criterion.

14. The computerized method of claim 8, wherein the graph comprises a graph of documents including a plurality of nodes corresponding to a plurality of assets and the plurality of sub-graphs corresponding to at least one of the plurality of nodes to define an identity represented asset, the plurality of sub-graphs defining a plurality of variants for the identity represented asset to associate the plurality of sub-graphs with the identity represented asset.

15. The computerized method of claim 14, wherein the plurality of sub-graphs define reverse links in the graph.

16. One or more computer storage media having computer-executable instructions for image processing that, upon execution by a processor, cause the processor to at least:
   store a plurality of identity represented assets, wherein a single entity corresponding to one of the plurality of identity represented assets represents a plurality of entities across a plurality of variants of the single entity;

receive one or more criterion corresponding to a desired asset;

traverse a graph of documents during runtime corresponding to the one of the plurality of identity represented assets to generate the desired asset, the graph traversal selecting one or more of the plurality of variants for the desired asset based on the received one or more criterion; and publish the desired asset having the one or more of the plurality of variants.

17. The one or more computer storage media of claim 16, wherein the one or more criterion comprises at least one of a locale, a market, a target, or an experiment.

18. The one or more computer storage media of claim 16, wherein traversing the graph of documents comprises selecting nodes in the graph of documents to localize the desired asset.

19. The one or more computer storage media of claim 16 having further computer-executable instructions that, upon execution by a processor, cause the processor to use a single logical identifier in combination with the one or more criterion to select the one or more of the plurality of variants for the desired asset.

20. The one or more computer storage media of claim 16 having further computer-executable instructions that, upon execution by a processor, cause the processor to at least localize metadata corresponding to the plurality of identity represented assets, and render the desired asset having the one or more of the plurality of variants to an associated locale that is automatically selected based on the one or more criterion.

\* \* \* \* \*